United States Patent [19]

Maeda et al.

[11] Patent Number: 5,431,748
[45] Date of Patent: Jul. 11, 1995

[54] ELECTRIC-RESISTANCE-WELDED STEEL PIPE WITH HIGH STRENGTH

[75] Inventors: Tatsuo Maeda; Toshihiro Takamura; Yoshiichi Ishizawa; Yuji Sugimoto; Mitoshi Morimoto; Tetsuro Sugayoshi; Fumihiro Nishimura, all of Kawasaki, Japan

[73] Assignee: NKK Corporation, Tokyo, Japan

[21] Appl. No.: 181,198

[22] Filed: Jan. 13, 1994

Related U.S. Application Data

[62] Division of Ser. No. 813,361, Dec. 24, 1991, Pat. No. 5,286,309.

[30] Foreign Application Priority Data

Dec. 25, 1990 [JP] Japan .................. 2-413017

[51] Int. Cl.⁶ .................. C22C 38/04; C22C 38/12
[52] U.S. Cl. .................. 148/320; 148/909; 148/333; 138/177; 138/DIG. 6
[58] Field of Search .................. 148/909, 320, 333; 138/177, DIG. 6

[56] References Cited

U.S. PATENT DOCUMENTS 4,210,467 7/1980 Klatzer et al. .
4,740,255 4/1988 Manton .
4,799,971 1/1989 McDougall et al. .

FOREIGN PATENT DOCUMENTS 0004063 9/1979 European Pat. Off. .
0269994 6/1988 European Pat. Off. .
1412356 8/1965 France .
1566594 3/1969 France .
56-69354 6/1981 Japan .
1-205032 8/1989 Japan .
2-197525 8/1990 Japan .

OTHER PUBLICATIONS

Patent Abstracts of Japan, vol. 9, No. 077, Apr. 6, 1985, of JP-A-59 206183, Nov. 1984.
Patent Abstracts of Japan, vol. 9, No. 282, Nov. 9, 1985 of JP-A-60 124483, Jul. 1985.

*Primary Examiner*—Deborah Yee
*Attorney, Agent, or Firm*—Frishauf, Holtz, Goodman & Woodward

[57] ABSTRACT

An electric-resistance-welded steel pipe with high strength consists essentially of 0.05 to 0.30 wt. % C, 0.6 to 2.0 wt. % Mn, 0.03 to 0.70 wt. % Si, and 0.01 to 0.05 wt. % Nb. The balance is Fe and inevitable impurities, the steel pipe having a martensitic phase ratio of 60 to 100% and having a tensile strength of 120 to 170 kgf/mm².

5 Claims, 2 Drawing Sheets

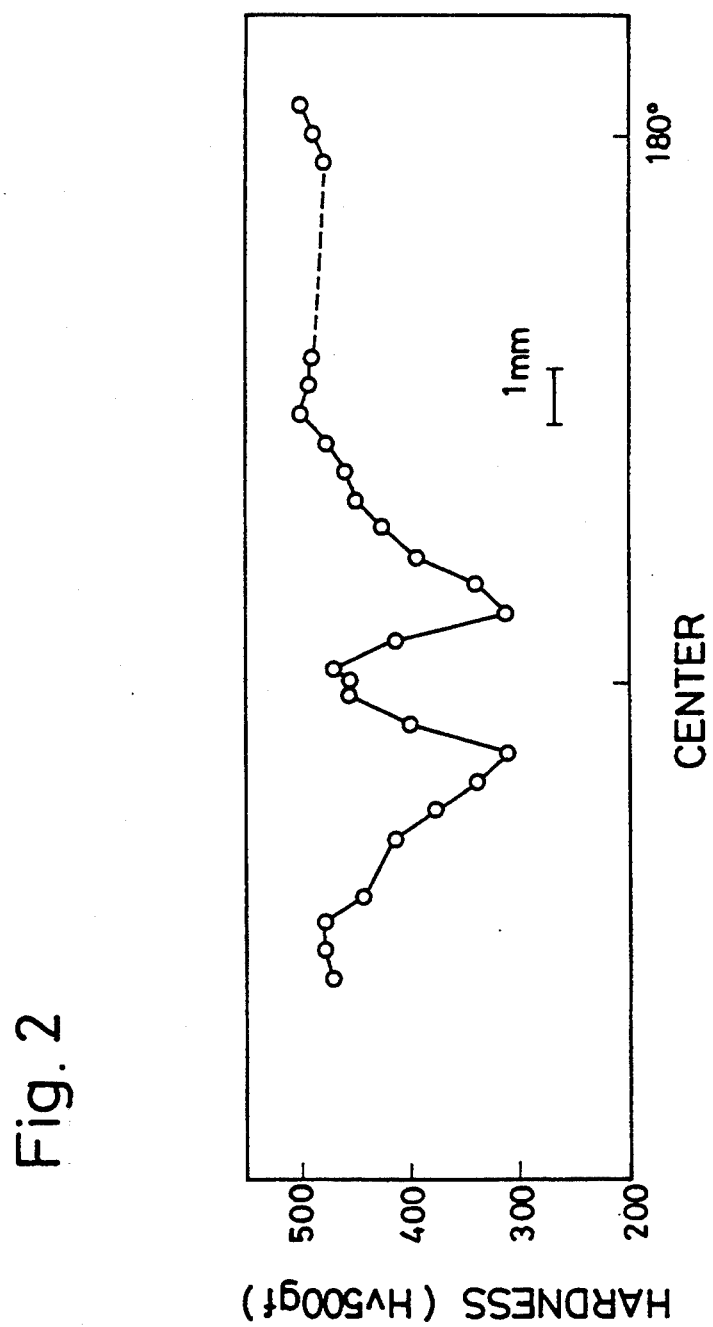

ELECTRIC-RESISTANCE-WELDED STEEL PIPE WITH HIGH STRENGTH

This application is a division of application Ser. No. 07/813,361 filed Dec. 24, 1991, now U.S. Pat. No. 5,286,309 issued Feb. 15, 1994.

BACKGROUND OF THE INVENTION

1. Field of the Invention

The present invention relates to an electric-resistance-welded steel pipe with high strength for a door impact bar used for cars, and more particularly to an electric-resistance-welded steel pipe with high-strength for an impact bar used for the inside of an automobile.

1. Description of the Related Arts

In regard to doors for vehicles such as automobiles, a reinforcing material made of steel or the like is applied to the inside of a door to secure the safety of passengers in a car when another car crashes into the side of the car and to lighten the car weight. This reinforcement material is referred to as a door impact bar. Japanese Patent Application Laid Open No.197525/90 discloses a reinforcement material of a tube or a reinforcement material having a tensile strength of from 60 to 100 kgf/mm$^2$ after stress relief annealing at a low temperature.

It is undesirable, however, to use the prior art reinforcement material as the door impact bar. The reinforcement material having a tensile strength of from 60 to 100 kgf/mm$^2$ is insufficient for the door impact bar. Even though only this tensile strength is improved, properties effective for the door impact bar cannot be obtained.

SUMMARY OF THE INVENTION

It is an object of the present invention to provide an electric-resistance-welded steel pipe with high strength which is desirable as a door impact bar.

To attain the above-described object, the present invention provides an electric-resistance-welded steel pipe with high strength, consisting essentially of 0.05 to 0.30 wt. % C, 0.6 to 2.0 wt. % Mn, 0.03 to 0.70 wt. % Si, the balance being Fe and inevitable impurities, said steel pipe having a martensitic phase ratio of 60 to 100% and having a tensile strength of 120 to 170 kgf/mm$^2$.

Further, the present invention provides an electric-resistance-welded steel pipe with high strength, consisting essentially of 0.05 to 0.30 wt. % C, 0.6 to 2.0 wt. % Mn, 0.03 to 0.70 wt. % Si, at least one selected from the group consisting of 0.05 wt. % Nb or less, 1.2 wt. % Cr or less, 0.5 wt. % Mo or less, 0.1 wt. % V or less, 0.05 wt. % Ti or less and 0.005 wt. % B or less, the balance being Fe and inevitable impurituies, said steel pipe having a martensitic phase ratio of 60 to 100% and having a tensile strength of 120 to 170 kgf/mm$^2$.

The above objects and other objects and advantages of the present invention will become apparent from the following detailed description, taken in conjunction with the appended drawings.

BRIEF DESCRIPTION OF THE DRAWINGS

FIG. 2 is an graphical presentation showing a distribution of hardnesses of an impact bar adjacent to a seam welded portion of the impact bar made of the electric-resistance-welded steel pipe of the present invention.

DESCRIPTION OF THE PREFERRED EMBODIMENT

Figure 1:
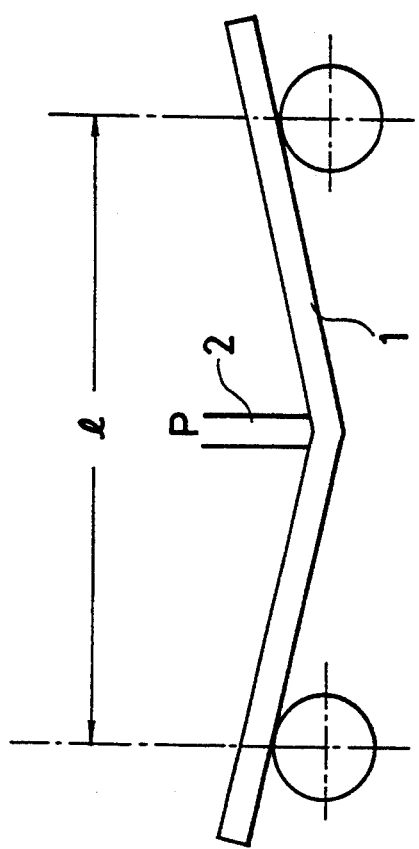
FIG. 1 is an schematic illustration describing a three-point bending test wherein properties of an impact bar made of an electric-resistance-welded steel pipe of the present invention were tested.

The reason for limiting the composition of the steel will now be described as follows:

C is an element which produces a martensite structure and increasing hardness of the martensite. C is an element indispensable for obtaining a strength which is an object of the present invention. When the content of C is less than 0.05 wt. %, a predetermined strength cannot be obtained. When the content of C exceeds 0.30 wt. %, a slab is liable to be cracked, the impact resistance of a final product is lowered or the weldability of the final product in $CO_2$ gas shielded arc welding is lowered. The content of 0.05 to 0.30 wt. % C is desirable.

Mn is an element for increasing the hardenability of austenite. The content of 0.6 wt. % Mn is required to control an amount of martensite and to obtain a predetermined strength of a slab. When the content of Mn exceeds 2.0 wt. %, an effect is saturated in the case of carrying out a continuos annealing of steel by means of a rapid water quenching. Conversely, such content has a an adverse bad influence on a bending workability during manufacturing of a pipe. The content of 0.6 to 2.0 wt. % Mn is desirable.

Si is a deoxidizing element. Si contributes to an increase of mechanical properties of a steel sheet and increases the ductility of the steel sheet. When the content of Si is less than 0.03 wt. %, predetermined mechanical properties or ductility cannot be obtained. However, when the content of Si exceeds 0.7 wt. %, spattering is often generated during electric-resistance welding, which lowers mechanical properties and the impact resistance of an electric-resistance-welded pipe. The content of 0.03 to 0.70 wt. % Si is desirable.

Cr, Mn and Si are elements indispensable for an electric-resistance-welded steel pipe of the present invention, and the balance elements are Fe and impurities. The quality of an electric-resistance-welded portion of a pipe is improved by the above-mentioned range of elements.

In the present invention, however, at least one element selected from the group consisting of Nb, Cr, Mo, V, Ti and B can be added to steel within a predetermined range as the case may be required. The properties of each of the elements are effectively utilized for purposes.

Nb contributes to making a finer martensite structure of steel and to improving the hardenability of steel. Cr, Mo, V, Ti and B are elements for increasing the hardenability. When the content of Nb exceeds 0.05 wt. %, the spatterring is liable to be generated during electric-resistance welding, which lowers the mechanical properties of an electric-resistance welded portion. 0.05 wt. % is determined to be the upper limit of the content of Nb. When the content of Cr exceeds 1.2 wt. %, the content of Mo exceeds 0.5 wt. %, the content of V exceeds 0.1 wt. % or the content of Ti exceeds 0.05 wt. %, oxides such as $Cr_2O_3$, $MoO_2$, $V_2O_3$ and $TiO_2$ reside in the electric-resistance welded portion, which deteriorates the mechanical proporitics of the electric-resistance welded portion or decreases the impact resistance of a steel pipe. When the content of B exceeds 0.005 wt. %, workability of steel deteriorates.

The martensitic phase ratio is desired to be from 60 to 100% When the martensitic phase ratio is less than 60%, the tensile strength of steel is rapidly decreased. The tensile strength cannot be increased to 120 kgf/mm$^2$ or more.

Example

The present inventors produced a steel pipe having a wall thickness of 2.1 mm and a diameter of 34.0 mm, which has elements and structures as shown in Table 1 (A) and (B). Nos. 1 to 14, Nos. 17 and 18 show Examples of the present invention. Nos. 15, 16 and 19 show Comparisons.

A slab having composition as shown in Table 1 (A) was used. Nos. 1 to 4 have the composition of 0.05 to 0.30 wt. % C, 0.6 to 2.0 wt. % Mn, 0.03 to 0.70 wt. % Si, the balance being Fe and inevitable impurities.

Nos. 5 to 9, 14, 17 and 18 have the composition of 0.05 to 0.30 wt. % C, 0.6 to 2.0 wt. % Mn, 0.03 to 0.70 wt. % Si, one element selected from the group consisting of 0.05 wt. % Nb or less, 1.2 wt. % Cr or less, 0.5 wt. % Mo or less, 0.1 wt. % V or less, 0.05 wt. % Ti or less and 0.005 wt. % B or less, the balance being Fe and inevitable impurituies.

No. 10 has the composition of 0.05 to 0.30 wt. % C, 0.6 to 2.0 wt. % Mn, 0.03 to 0.70 wt. % Si, 1.2 wt. % Cr or less and 0.5 wt. % Mo or less.

No. 11 has the composition of 0.05 to 0.30 wt. % C, 0.6 to 2.0 wt. % Mn, 0.03 to 0.70 wt. % Si, 0.05 wt. % Ti or less and 0.005 wt. % B or less.

No. 12 has the composition of 0.05 to 0.30 wt. % C, 0.6 to 2.0 wt. % Mn, 0.03 to 0.70 wt. % Si, 1.2 wt. % Cr or less, 0.5 wt. % Mo or less and 0.1 wt. % V or less.

No. 13 has the composition of 0.05 to 0.30 wt. % C, 0.6 to 2.0 wt. % Mn, 0.03 to 0.70 wt. % Si, 0.05 wt. % Nb or less, 1.2 wt. % Cr or less, 0.5 wt. % Mo or less, 0.1 wt. % V or less, 0.05 wt. % Ti or less and 0.005 wt. % B.

A steel sheet produced by hot-rolling said slab or a steel sheet produced by hot-rolling and cold-rolling said slab was continuously annealed. Treatments such as soaking in the continuous annealing, continuous water quenching and heat treatment were carried out under the following conditions:

The soaking treatment was carried out at a temperature of 870°C. The temperature within a range of from 800° to 900° C. was appropriately used. The water quenching was carried out at a line speed of 50 to 120 m/min and at a cooling rate of 800° to 1500° C. /sec. The heat treatment was carried out at a temperature of 100° to 300° C. for ten minutes.

Mechanical properties of the manufactured steel pipe are shown in Table 1 (B). The steel pipe according to the Example of the present invention had a high strength of 122 to 168 kgf/mm$^2$. The yield point of the steel pipe was 85 to 151 kgf/mm$^2$. The maximum load at the time of the three-point bending test was 1150 kgf or more. Except for No. 18, the maximum load was 1200 kgf or more. The maximum load at the time of the three-point bending test according to the Comparison was 1100 kgf or less. As a result, it was confirmed that the steel pipe according to the present invention had desirable properties for an impact bar for doors of automobiles. A method for measuring the maximum load at the time of the three-point bending test is shown in FIG. 1. A specimen 1 was put on a bending span of 822 mm. A bending jig 2 was pressed on the midpoint of the specimen 1.

A distribution of hardnesses of steel of the present invention adjacent to the electric-resistance welded portion of the steel pipe is shown in FIG. 2. Although the hardnesses of steel adjacent to the electric-resistance welded portion of the steel pipe were somewhat decreased as shown in FIG. 2, a portion having a high hardness was formed again at the center of the electric-resistance welded portion. It is clearly seen from a high tensile strength and high maximum load that a formation of the portion having a high hardness at the center of the electric-resistance welded portion realizes properties desirable as an impact bar.

Even in the case where the water quenching and annealing are applied to an electric-resistance welded steel pipe produced by using a steel of the present invention, an electric-resistance welded steel pipe with a high strength for the impact bar having a tensile strength of 120 to 170 kgf/mm$^2$ can be obtained.

According to the present invention as described above, an electric-resistance welded steel pipe having a high strength and other properties desirable for a impact bar for doors of automobiles and other vehicles to safety secure passengers in a car can be obtained, which produces an industrially great effect.

TABLE 1 (A)

| No | C | Si | Mn | Nb | Cr | Mo | V | Ti | B | Remarks |
|---|---|---|---|---|---|---|---|---|---|---|
| 1 | 0.20 | 0.33 | 0.80 | | | | | | | Example |
| 2 | 0.15 | 0.33 | 1.76 | | | | | | | Example |
| 3 | 0.20 | 0.40 | 1.76 | | | | | | | Example |
| 4 | 0.27 | 0.33 | 0.80 | | | | | | | Example |
| 5 | 0.20 | 0.40 | 1.76 | 0.015 | | | | | | Example |
| 6 | 0.15 | 0.33 | 1.60 | | 1.0 | | | | | Example |
| 7 | 0.15 | 0.33 | 1.60 | | | 0.3 | | | | Example |
| 8 | 0.15 | 0.33 | 1.60 | | | | 0.060 | | | Example |
| 9 | 0.15 | 0.33 | 1.60 | | | | | 0.020 | | Example |
| 10 | 0.15 | 0.33 | 1.60 | | 1.1 | 0.4 | | | | Example |
| 11 | 0.15 | 0.33 | 1.60 | | | | | 0.010 | 0.001 | Example |
| 12 | 0.15 | 0.33 | 1.60 | | 0.6 | 0.2 | 0.042 | | | Example |
| 13 | 0.07 | 0.10 | 0.65 | 0.005 | 0.4 | 0.3 | 0.044 | 0.008 | 0.001 | Example |
| 14 | 0.15 | 0.33 | 1.60 | 0.010 | | | | | | Example |
| 15 | 0.03 | 0.10 | 0.80 | 0.005 | 0.4 | 0.3 | 0.044 | 0.008 | 0.001 | Comparison |
| 16 | 0.07 | 0.10 | 0.55 | 0.005 | 0.4 | 0.3 | 0.044 | 0.008 | 0.001 | Comparison |
| 17 | 0.15 | 0.33 | 1.60 | 0.010 | | | | | | Example |
| 18 | 0.15 | 0.33 | 1.60 | 0.010 | | | | | | Example |
| 19 | 0.15 | 0.33 | 1.60 | 0.010 | | | | | | Comparison |

TABLE 1 (B)

| No. | Yield Strength Kgf/mm² | Tensile Strength Kgf/mm² | Martensitic Phase Ratio % | Maximum Load Kgf | Remarks |
| --- | --- | --- | --- | --- | --- |
| 1 | 118 | 125 | 100 | 1202 | Example |
| 2 | 130 | 135 | 100 | 1297 | Example |
| 3 | 122 | 162 | 100 | 1558 | Example |
| 4 | 142 | 154 | 100 | 1483 | Example |
| 5 | 145 | 168 | 100 | 1618 | Example |
| 6 | 139 | 153 | 100 | 1475 | Example |
| 7 | 141 | 158 | 100 | 1522 | Example |
| 8 | 137 | 147 | 76 | 1413 | Example |
| 9 | 127 | 132 | 80 | 1272 | Example |
| 10 | 138 | 152 | 100 | 1461 | Example |
| 11 | 143 | 154 | 100 | 1481 | Example |
| 12 | 151 | 159 | 100 | 1532 | Example |
| 13 | 115 | 125 | 65 | 1205 | Example |
| 14 | 134 | 140 | 100 | 1346 | Example |
| 15 | 107 | 118 | 58 | 1098 | Comparison |
| 16 | 95 | 105 | 52 | 1011 | Comparison |
| 17 | 105 | 131 | 70 | 1261 | Example |
| 18 | 85 | 122 | 62 | 1174 | Example |
| 19 | 109 | 115 | 50 | 1087 | Comparison |

What is claimed is:

1. An electric-resistance-welded steel pipe with high strength, consisting of C, Mn, Si, Nb and Fe in the following amounts: 0.05 to 0.3 wt. % C, 0.6 to 2 wt. % Mn, 0.03 to 0.7 wt. % Si, 0.01 to 0.05 wt. % Nb, and the balance being Fe and inevitable impurities, said steel pipe having a martensitic phase in an amount of 60 to 100% and having a tensile strength of 120 to 170 kgf/mm².

2. The electric-resistance-welded steel pipe of claim 1, consisting of 0.20 wt. % C, 0.40 wt. % Si, 1.76 wt. % Mn and 0.015 wt. % Nb.

3. The electric-resistance-welded steel pipe of claim 1, consisting of 0.15 wt. % C, 0.33 wt. % Si, 1.60 wt. % Mn and 0.010 wt. % Nb.

4. The electric-resistant-weld steel pipe of claim 1, wherein the Nb is in an amount of 0.01 to 0.015 wt. %.

5. The electric-resistant-welded steel pipe of claim 1, produced by
    continuously annealing a steel sheet by soaking the steel sheet at a temperature of 800° to 900° C., quenching the soaked steel sheet at a rate of 800° to 1500° C./second and heat-treating at a temperature of 100° to 300° C.; and
    forming the continuously annealed steel sheet into an electric-resistance-welded steel pipe.

* * * * *